United States Patent
Bauer et al.

(10) Patent No.: US 8,555,618 B2
(45) Date of Patent: Oct. 15, 2013

(54) METHOD FOR DETECTING THE MINIMUM OPENING TIME OF A REDUCING AGENT FEED DEVICE IN AN EXHAUST GAS AFTERTREATMENT SYSTEM COMPRISING AN SCR CATALYST

(75) Inventors: Peter Bauer, Immenreuth (DE); Rainer Bentz, St. Wendel (DE); Joris Fokkelman, Tegernheim (DE); Joachim Frank, Coburg (DE); Hermann Ketterl, Stephansposching (DE); Ingo Koops, Regensburg (DE); Robert Leinfelder, München (DE)

(73) Assignee: Continental Automotive GmbH, Hannover (DE)

( * ) Notice: Subject to any disclaimer, the term of this patent is extended or adjusted under 35 U.S.C. 154(b) by 160 days.

(21) Appl. No.: 12/678,553

(22) PCT Filed: Sep. 18, 2008

(86) PCT No.: PCT/EP2008/062481
§ 371 (c)(1),
(2), (4) Date: May 12, 2010

(87) PCT Pub. No.: WO2009/037327
PCT Pub. Date: Mar. 26, 2009

(65) Prior Publication Data
US 2010/0257842 A1  Oct. 14, 2010

(30) Foreign Application Priority Data
Sep. 19, 2007  (DE) .......................... 10 2007 044 610

(51) Int. Cl.
*F01N 3/20* (2006.01)
*F01N 9/00* (2006.01)

(52) U.S. Cl.
USPC .............................. 60/295; 60/286

(58) Field of Classification Search
USPC ..................................... 60/286, 295
See application file for complete search history.

(56) References Cited

U.S. PATENT DOCUMENTS 4,963,332 A * 10/1990 Brand et al. .................. 423/235
5,369,956 A * 12/1994 Daudel et al. ................... 60/276

(Continued)

FOREIGN PATENT DOCUMENTS

DE  3704030  8/1988
DE  4227741  2/1994

(Continued)

OTHER PUBLICATIONS

International Search Report and Written Opinion for Application No. PCT/EP2008/062481 (13 pages), Dec. 19, 2008.

*Primary Examiner* — Kenneth Bomberg
*Assistant Examiner* — Dapinder Singh
(74) *Attorney, Agent, or Firm* — King & Spalding L.L.P.

(57) ABSTRACT

In a method for adapting the reducing agent feed in an exhaust gas aftertreatment system having an SCR catalyst for removing nitrogen oxides from the exhaust gas of an internal combustion engine and at least one reducing agent feed device, the minimum opening time of the reducing agent feed device is determined during operation and while suspending nitrogen emission, carrying out the following steps: a) the opening time of the reducing agent feed device is gradually prolonged until b) a reducing agent-sensitive sensor in the exhaust gas aftertreatment system detects a reducing agent signal. An exhaust gas aftertreatment system is designed accordingly for carrying out the method and a device is designed for controlling an exhaust gas aftertreatment system.

17 Claims, 1 Drawing Sheet

(56) References Cited

U.S. PATENT DOCUMENTS

| | | | |
|---|---|---|---|
| 5,540,047 A * | 7/1996 | Dahlheim et al. | 60/274 |
| 6,017,503 A * | 1/2000 | Kato et al. | 423/235 |
| 6,082,102 A | 7/2000 | Wissler et al. | 60/286 |
| 6,182,444 B1 * | 2/2001 | Fulton et al. | 60/277 |
| 6,269,633 B1 * | 8/2001 | van Nieuwstadt et al. | 60/277 |
| 6,626,798 B1 * | 9/2003 | Zillmer et al. | 477/183 |
| 7,028,465 B2 | 4/2006 | Ripper et al. | 60/286 |
| 7,320,781 B2 | 1/2008 | Lambert et al. | 423/239.1 |
| 7,428,809 B2 | 9/2008 | Wickert et al. | 60/286 |
| 2003/0005683 A1 | 1/2003 | Lambert et al. | 60/276 |
| 2004/0055284 A1 | 3/2004 | Ripper et al. | 60/286 |
| 2005/0282285 A1 | 12/2005 | Radhamohan et al. | 436/55 |
| 2006/0080952 A1 | 4/2006 | Wickert et al. | 60/286 |

FOREIGN PATENT DOCUMENTS

| | | |
|---|---|---|
| DE | 19743337 | 1/1999 |
| DE | 10100420 A1 | 7/2002 |
| DE | 10301606 | 7/2004 |
| DE | 102004046639 A1 | 3/2006 |
| EP | 1164266 | 12/2001 |

\* cited by examiner

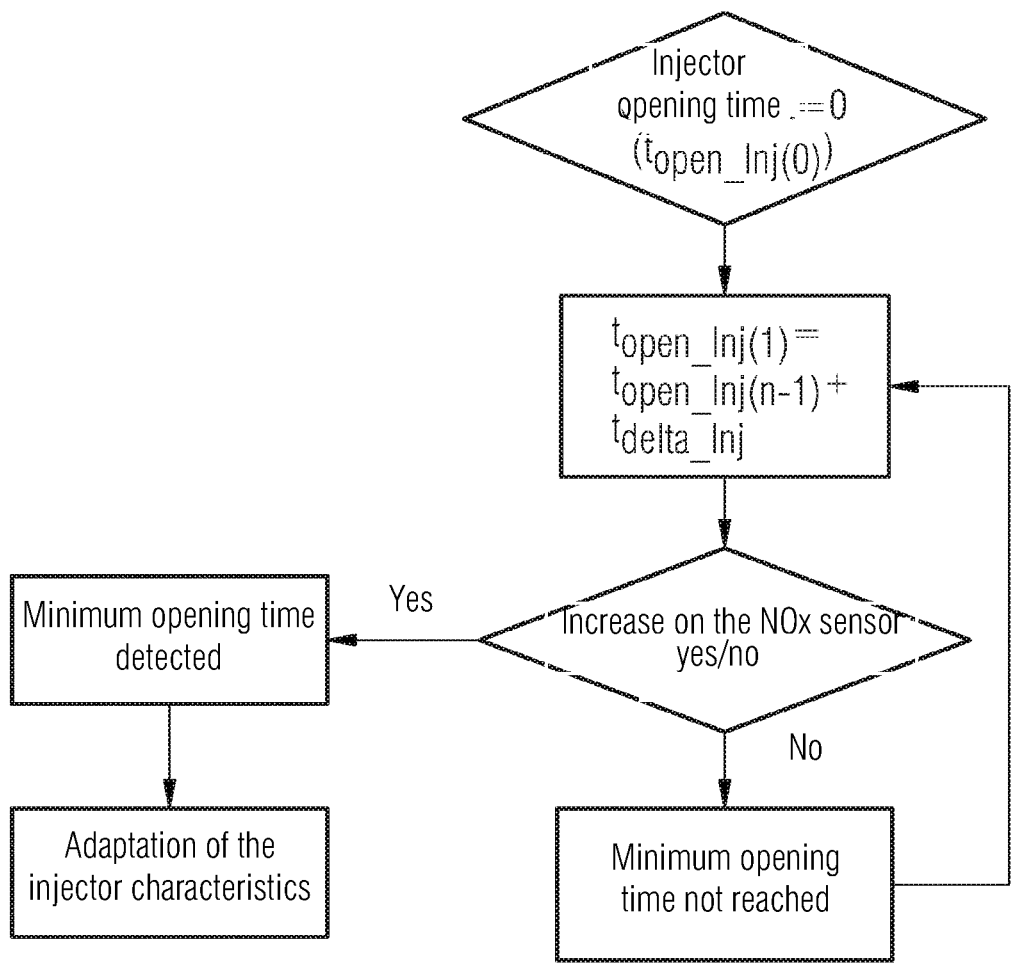

METHOD FOR DETECTING THE MINIMUM OPENING TIME OF A REDUCING AGENT FEED DEVICE IN AN EXHAUST GAS AFTERTREATMENT SYSTEM COMPRISING AN SCR CATALYST

CROSS-REFERENCE TO RELATED APPLICATIONS

This application is a U.S. National Stage Application of International Application No. PCT/EP2008/062481 filed Sep. 18, 2008, which designates the United States of America, and claims priority to German Application No. 10 2007 044 610.3 filed Sep. 19, 2007, the contents of which are hereby incorporated by reference in their entirety.

TECHNICAL FIELD

The invention relates to a method for detecting the minimum opening time of a reducing agent feed device in an exhaust gas aftertreatment system comprising an SCR catalyst for removing nitrogen oxides from the exhaust gas of an internal combustion engine as well as a control device for an exhaust gas aftertreatment system for carrying out said method.

BACKGROUND

Various methods have been established for reducing pollutants, in particular for reducing nitrogen oxides, in which reducing fluids (gases or liquids) are introduced into the exhaust gas system of an internal combustion engine.

SCR-technology has proved particularly advantageous for reducing nitrogen oxides, in which the nitrogen oxides (NOx) contained in the oxygen-rich exhaust gas are selectively reduced to form nitrogen and water, by means of ammonia or a precursor substance which may accordingly be converted to ammonia. Preferably, in this case aqueous urea solutions are used. The urea solution is hydrolyzed by means of hydrolysis catalysts or directly on the SCR catalyst to form ammonia and carbon dioxide. To this end, the urea solution is injected into the exhaust gas flow by means of special metering systems upstream of the hydrolysis catalyst or the SCR catalyst. In this connection, there is the problem firstly of determining the optimum quantity of reducing agent, and secondly of ensuring the correct supply and metering of the reducing agent.

If correct and reliable metering is not ensured, an efficient removal of nitrogen oxide (NOx) from the exhaust gas may not be achieved. An overdosage of reducing agent, on the other hand, may result in an undesired emission of ammonia, for example, a so-called break-through of reducing agent.

With liquid reducing agents, such as conventional urea solutions, the metering may take place by means of an injector. The activation time and thus the opening time of the injector, therefore, have an effect on the quantity of reducing agent supplied to the exhaust gas after-treatment system.

As a result of production tolerances and ageing over the lifetime of the metering system, the characteristics of the injector and thus the required opening time for the reducing agent feed may change and thus the quantity injected may not be accurately predicted. In order to achieve a maximum conversion rate of the nitrogen oxides (NOx), however, generally the metering of the reducing agent used has to be accurate and according to requirements. In order to correct inaccuracies of the injection system, it is known to use so-called closed loop controls. Said closed loop controls, however, require complicated detection in terms of measuring technology of the actual quantity of reducing agent injected.

In DE 101 00 420 A1, a method for controlling an exhaust gas aftertreatment system for an internal combustion engine is disclosed, in which a predeterminable quantity of reducing agent is supplied depending on the state of the internal combustion engine or the exhaust gas aftertreatment system. The quantity of reducing agent supplied is thus varied depending on the detection of an overdosage and/or underdosage of the reducing agent, with regard to the nitrogen oxide conversion of the SCR catalyst. The method is complicated and dependent on very many parameters, both of the internal combustion engine and the entire exhaust gas aftertreatment system. In this case, however, production tolerances, functional alterations or malfunctions of the reducing agent metering system are not taken into account.

SUMMARY

According to various embodiments, a method for adapting the reducing agent feed in an exhaust gas aftertreatment system for an internal combustion engine for removing nitrogen oxides using an SCR catalyst which, during normal operation, permits in a simple manner an optimization of the quantity of reducing agent supplied.

According to an embodiment, in a method for adapting the reducing agent feed in an exhaust gas aftertreatment system comprising an SCR catalyst for removing nitrogen oxides from the exhaust gas of an internal combustion engine and at least one reducing agent feed device, the minimum opening time of the reducing agent feed device is determined during operation and, while suspending nitrogen oxide emission, by carrying out the following steps:
a) the opening time of the reducing agent feed device is gradually prolonged until
b) a reducing agent-sensitive sensor in the exhaust gas aftertreatment system detects a reducing agent signal.

According to a further embodiment, ammonia or a precursor substance of ammonia can be used as reducing agent, preferably a urea solution. According to a further embodiment, the reducing agent-sensitive sensor can be a nitrogen oxide sensor with cross-sensitivity to ammonia in the exhaust gas aftertreatment system. According to a further embodiment, the detection of the reducing agent signal can be carried out by a reducing agent-sensitive sensor, which is arranged in the exhaust gas aftertreatment system downstream of the reducing agent feed device and upstream of the SCR catalyst. According to a further embodiment, the detection of the reducing agent signal may take place by a reducing agent-sensitive sensor, which is arranged in the exhaust gas aftertreatment system downstream of, or within, the SCR catalyst, the determination of the minimum opening time in step a) taking place by suspending nitrogen oxide conversion in the SCR catalyst. According to a further embodiment, the determination of the minimum opening time of the reducing agent feed device can be repeated by steps a) and b), in step a) the previously determined minimum opening time being used as an initialization value. According to a further embodiment, in a step c) an adaptation of the quantity of reducing agent injected can be carried out depending on the detected minimum opening time.

According to another embodiment, an exhaust gas aftertreatment system is configured for carrying out the method as described above.

According to a further embodiment of the exhaust gas aftertreatment system, the system can be coupled to an on-board diagnostics system.

According to yet another embodiment, a device for controlling an exhaust gas aftertreatment system may comprise means for determining the minimum opening time of a reducing agent feed device and for adapting the quantity of reducing agent injected depending on the detected minimum opening time.

BRIEF DESCRIPTION OF THE DRAWINGS

The invention is explained hereinafter by way of example with reference to the drawings. The invention is, however, not restricted to the exemplary embodiment shown.

FIG. 1 shows a schematic flow diagram of a method according to the invention.

DETAILED DESCRIPTION

According to various embodiments, a method is provided for adapting the reducing agent feed in an exhaust gas aftertreatment system comprising an SCR catalyst for removing nitrogen oxides from the exhaust gas of an internal combustion engine and at least one reducing agent feed device, in which the minimum opening time of the reducing agent feed device is determined during operation and, while suspending nitrogen oxide emission, by carrying out the following steps:
a) the opening time of the reducing agent feed device is gradually prolonged until
b) a reducing agent-sensitive sensor in the exhaust gas aftertreatment system detects a reducing agent signal.

By the term "reducing agent feed device" is understood, in particular, a metering system for the metered supply of a reducing agent into an exhaust gas aftertreatment system. For liquid reducing agents, the metering system may be an injector system. The reducing agent-sensitive sensor is also denoted as a reducing agent sensor. When controlled and activated by a control device, each reducing agent feed device has a time period in which no further reducing agent is introduced into the system for mechanical and production reasons, amongst other things. The time period in which, during activation, a reducing agent is actually fed into the exhaust gas system is defined according to the invention as the minimum opening time.

Generally, therefore, an initial approximate value for the minimum opening time is known. However, the minimum opening time is subject to alterations as a result of ageing and operation, so that a periodic determination is advisable.

By the suspension of nitrogen oxide emission, according to various embodiments, it is understood that the engine in step a) does not emit any nitrogen oxides during the gradual increase in the opening time. This is, for example, the case during the overrun phase. The expression "gradual increase" within the meaning of various embodiments means that the activation time for the reducing agent feed device and thus the corresponding opening time may be extended in stages of 10 ms, preferably 1 ms, particularly preferably 0.1 ms. However, according to the application and requirements, both longer and shorter opening times are possible.

According to various embodiments, therefore, a method is provided by which advantageously the minimum opening time of the reducing agent feed device may be directly detected, and as a result it is possible for conclusions to be drawn about the actual quantity of reducing agent supplied. Based on the determination of the minimum opening time for implementing a supply of reducing agent, according to various embodiments, the supplied quantity of reducing agent may be subsequently adapted and optimized in a simple manner during normal operation of the internal combustion engine. To this end, the determined minimum opening time may be stored as a value in the control device of the exhaust gas aftertreatment system. The determined value for the minimum opening time may, in particular, also be part of the characteristics of the reducing agent feed device, on which the control device is based. As a result, the overall performance of the exhaust gas aftertreatment system, in particular the nitrogen oxide removal, may be markedly improved by the SCR-technology. A further advantage is that the reducing agent feed device may be separately monitored and diagnosed as a system component, as is required for an on-board diagnostics system. The monitoring of the minimum opening time additionally permits conclusions to be drawn about whether the reducing agent feed device is functional or whether there is an alteration to its feed characteristics or a malfunction.

In an embodiment of the method, ammonia or a precursor compound of ammonia may be used as reducing agent. Particularly proven in this case is a 32.5% aqueous urea solution, which is universally denoted in the industry as "Adblue", the composition thereof being regulated by DIN 70070. In a further preferred method variant, it may be provided that the reducing agent-sensitive sensor is a nitrogen oxide sensor with cross-sensitivity to ammonia in the exhaust gas aftertreatment system. Advantageously, therefore, different functions may be fulfilled by the same sensor(s) during operation, and an additional sensor for the detection of the ammonia as reducing agent does not have to be installed and integrated in the entire system. As a result, additional costs may be saved in the design and in the production of the exhaust gas aftertreatment system.

In a further embodiment of the method, the detection of the reducing agent signal may be carried out by a reducing agent-sensitive sensor, which is arranged in the exhaust gas aftertreatment system downstream of the reducing agent feed device and upstream of the SCR catalyst. In the case where initially a precursor substance is supplied, a position is understood thereby at which a complete conversion to the actual reducing agent has taken place. For example, with the preferred use of a urea solution, a complete conversion to ammonia should have taken place.

Similarly, the detection of the reducing agent signal may preferably take place by a reducing agent-sensitive sensor, which is arranged in the exhaust gas aftertreatment system downstream of, or within, the SCR catalyst, the determination of the minimum opening time in step a) taking place by suspending nitrogen oxide conversion in the SCR catalyst. This is, for example, the case when no reducing agent, for example ammonia, is stored in the SCR catalyst or when the temperature of the SCR catalyst is so high that it is not possible to store the reducing agent. Advantageously, the method according to the invention may thus be carried out in exhaust gas aftertreatment systems with different sensor arrangements without a new design of the sensor arrangement being necessary.

In a further embodiment of the method, the determination of the minimum opening time of the reducing agent feed device may be repeated by steps a) and b), in step a) the previously determined minimum opening time being used as an initialization value. Advantageously, this may accelerate the determination of the current minimum opening time and thus the adaptation of the reducing agent feed may take place more rapidly.

According to further embodiments, an exhaust gas aftertreatment system may carry out the above-described method. In the exhaust gas aftertreatment system configured according to various embodiments, during normal operation of an internal combustion engine, namely by the adaptation of the minimum opening time of the reducing agent feed device, according to the invention the quantity of reducing agent supplied may be adapted and optimized in a simple manner. As a result, the overall performance of the exhaust gas aftertreatment system and, in particular, the nitrogen oxide removal, may be markedly improved by the SCR-technology. A further advantage is that the reducing agent feed device may be separately monitored and diagnosed as a system component, as is required for an on-board diagnostics system.

In a further embodiment, the exhaust gas aftertreatment system is coupled to an on-board diagnostics system, which may display the functionality, and where appropriate a malfunction, of the reducing agent feed device. As a result, the lifetime of the entire system may be markedly improved.

According to yet another embodiment, a device for controlling an exhaust gas aftertreatment system, may comprise computer logic stored in non-transitory computer-readable media and executable by a processor for determining the minimum opening time of a reducing agent feed device and for adapting the quantity of reducing agent injected depending on the minimum opening time detected.

FIG. 1 shows a schematic flow diagram of a method according to the invention for a reducing agent feed device for liquid reducing agent, using an injector system. Based on an injector opening time $t_{o-pen\_Inj(0)}=0$ (I), the opening time of the reducing agent feed device, i.e. of the injector, is gradually prolonged by $t_{Delta\_Inj}$. Preferably, the previously determined minimum opening time is used as an initialization value for determining the minimum opening time. Advantageously, this may accelerate the determination of the current minimum opening time, and thus the adaptation of the reducing agent feed may take place more rapidly. If no increase in the reducing agent signal is determined on the reducing agent sensor, the minimum opening time for supplying reducing agent is not yet reached. The opening time is varied until a reducing agent signal is detected. If a reducing agent signal is detected on the reducing agent sensor, the minimum opening time may be determined and the reducing agent feed device and thus the reducing agent feed may be adapted.

Based on the currently detected minimum opening time of the injector, the characteristics thereof on which the control device of the exhaust gas aftertreatment system for controlling the reducing agent feed device is based, may also be adapted. The control device may also be part of a subordinate engine control unit.

What is claimed is:

1. A method for adapting the reducing agent feed during operation of an exhaust gas aftertreatment system comprising an SCR catalyst for removing nitrogen oxides from the exhaust gas of an internal combustion engine and at least one reducing agent feed device, comprising:
   selecting an opening time of the reducing agent feed device,
   operating the reducing agent feed device according to the opening time,
   determining whether or not a reducing agent-sensitive sensor in the exhaust gas aftertreatment system detects a presence of the reducing agent as a result of the reducing agent feed device being operated according to the opening time,
   in response to the reducing agent-sensitive sensor not detecting the presence of the reducing agent, automatically incrementally increasing the opening time of the reducing agent feed device by a predetermined incremental time period, and
   repeating the operating, determining, and incrementing steps until the reducing agent-sensitive sensor detects the presence of the reducing agent, such that the incrementally increased opening time at which the reducing agent-sensitive sensor detects the presence of the reducing agent is determined as a minimum opening time of the reducing agent feed device,
   wherein nitrogen oxide emission is suspended during the determination of the minimum opening time of the reducing agent feed device.

2. The method according to claim 1, wherein ammonia or a precursor substance of ammonia is used as reducing agent.

3. The method according to claim 2, wherein the reducing agent-sensitive sensor is a nitrogen oxide sensor with cross-sensitivity to ammonia in the exhaust gas aftertreatment system.

4. The method according to claim 1, wherein reducing agent-sensitive sensor is arranged in the exhaust gas aftertreatment system downstream of the reducing agent feed device and upstream of the SCR catalyst.

5. The method according to claim 1, wherein the reducing agent-sensitive sensor is arranged in the exhaust gas aftertreatment system downstream of, or within, the SCR catalyst, and wherein the determination of the minimum opening time occurs during a suspending of nitrogen oxide conversion in the SCR catalyst.

6. The method according to claim 1, wherein the determination of the minimum opening time of the reducing agent feed device is repeated with a previously determined minimum opening time being used as an initialization value.

7. The method according to claim 1, further comprising adapting the reducing agent feed injected depending on the determined minimum opening time.

8. A control device for controlling an exhaust gas aftertreatment system, wherein the control device is comprises computer logic stored in non-transitory computer-readable media and executable by a processor to:
   determine a minimum opening time of the reducing agent feed device during operation by a process including:
   select an opening time of the reducing agent feed device,
   operate the reducing agent feed device according to the opening time,
   determine whether a reducing agent-sensitive sensor in the exhaust gas aftertreatment system detects a presence of the reducing agent as a result of the reducing agent feed device being operated according to the opening time,
   in response to the reducing agent-sensitive sensor not detecting the presence of the reducing agent, automatically incrementally increase the opening time of the reducing agent feed device by a predetermined incremental time period, and
   repeat the operating, determining, and incrementing steps until the reducing agent-sensitive sensor detects the presence of the reducing agent, such that the incrementally increased opening time at which the reducing agent-sensitive sensor detects the presence of the reducing agent is determined as the minimum opening time of the reducing agent feed device,
   wherein nitrogen oxide emission is suspended during the determination of the minimum opening time of the reducing agent feed device.

9. The control device according to claim 8, wherein the system is coupled to an on-board diagnostics system.

10. The method according to claim 1, wherein a urea solution is used as reducing agent.

11. The control device according to claim 8, wherein ammonia or a precursor substance of ammonia is used as reducing agent.

12. The control device according to claim 8, wherein a urea solution is used as reducing agent.

13. The control device according to claim 11, wherein the reducing agent-sensitive sensor is a nitrogen oxide sensor with cross-sensitivity to ammonia in the exhaust gas aftertreatment system.

14. The control device according to claim 8, wherein reducing agent-sensitive sensor is arranged in the exhaust gas aftertreatment system downstream of the reducing agent feed device and upstream of the SCR catalyst.

15. The control device according to claim 8, wherein the reducing agent-sensitive sensor is arranged in the exhaust gas aftertreatment system downstream of, or within, the SCR catalyst, and wherein the determination of the minimum opening time occurs during a suspending of nitrogen oxide conversion in the SCR catalyst.

16. The control device according to claim 8, wherein the determination of the minimum opening time of the reducing agent feed device is repeated with a previously determined minimum opening time being used as an initialization value.

17. The control device according to claim 8, further programmed to adapt an injected quantity of the reducing agent based on the determined minimum opening time.

* * * * *